(12) United States Patent
Nagatomo et al.

(10) Patent No.: US 8,885,950 B2
(45) Date of Patent: Nov. 11, 2014

(54) PATTERN MATCHING METHOD AND PATTERN MATCHING APPARATUS

(75) Inventors: Wataru Nagatomo, Hitachinaka (JP); Yuichi Abe, Mito (JP); Mitsuji Ikeda, Hitachinaka (JP)

(73) Assignee: Hitachi High-Technologies Corporation, Tokyo (JP)

( * ) Notice: Subject to any disclaimer, the term of this patent is extended or adjusted under 35 U.S.C. 154(b) by 184 days.

(21) Appl. No.: 13/502,823

(22) PCT Filed: Oct. 6, 2010

(86) PCT No.: PCT/JP2010/005976
§ 371 (c)(1),
(2), (4) Date: Apr. 19, 2012

(87) PCT Pub. No.: WO2011/048758
PCT Pub. Date: Apr. 28, 2011

(65) Prior Publication Data
US 2012/0207397 A1    Aug. 16, 2012

(30) Foreign Application Priority Data

Oct. 22, 2009   (JP) ................ 2009-242935

(51) Int. Cl.
*G06K 9/00*    (2006.01)
*G06K 9/62*    (2006.01)
*G06T 7/00*    (2006.01)
*G06K 9/68*    (2006.01)

(52) U.S. Cl.
CPC ..... *G06K 9/6203* (2013.01); *G06T 2207/10061* (2013.01); *G06T 7/0044* (2013.01); *G06K 9/6857* (2013.01); *G06T 2207/30148* (2013.01); *G06K 9/6253* (2013.01); *G06T 2207/20016* (2013.01); *H01J 2237/226* (2013.01); *H01J 2237/221* (2013.01); *G06K 9/6255* (2013.01)

USPC ............................ 382/218; 382/181; 382/209

(58) Field of Classification Search
USPC ............ 382/218, 209, 217, 219, 181; 706/62, 706/48, 46, 47; 707/758, 716, 803
See application file for complete search history.

(56) References Cited

U.S. PATENT DOCUMENTS 5,600,734 A    2/1997    Okubo et al.
5,825,912 A    10/1998   Okubo et al.
(Continued)

FOREIGN PATENT DOCUMENTS

JP     6-37161 A     2/1994
JP     10-21393 A    1/1998
(Continued)

OTHER PUBLICATIONS

International Search Report including English language translation dated Nov. 9, 2010 (Four (4) pages).

*Primary Examiner* — Sheela Chawan
(74) *Attorney, Agent, or Firm* — Crowell & Moring LLP

(57) ABSTRACT

Provided is a template matching method and a template matching apparatus, where the degree of matching between a template and the actual image upon template matching is maintained at a high level, without depending on a partial appearance of a lower layer. Proposed as one embodiment, is a method and an apparatus for template matching, where either an area is set in which comparison of the template and the image is not conducted, or a second area is set inside the template where comparison different from comparison conducted in a first comparison area is to be conducted, and the template matching is conducted on the basis either of comparison excluding the non-comparison area, or of comparison using the first and second areas.

19 Claims, 13 Drawing Sheets

(56) References Cited

U.S. PATENT DOCUMENTS

| | | |
|---|---|---|
| 5,872,862 A | 2/1999 | Okubo et al. |
| 6,627,888 B2 | 9/2003 | Yamaguchi et al. |
| 6,665,441 B1 * | 12/2003 | Nishio ............... 382/209 |
| 7,026,615 B2 * | 4/2006 | Takane et al. ......... 250/310 |
| 7,625,938 B2 * | 12/2009 | Brockunier et al. .... 514/406 |
| 7,636,703 B2 * | 12/2009 | Taylor ................. 706/62 |
| 8,239,341 B2 * | 8/2012 | Chen et al. ............ 706/48 |
| 8,260,799 B2 * | 9/2012 | Chen et al. ............ 707/758 |
| 2002/0158199 A1 | 10/2002 | Takane et al. |
| 2003/0173516 A1 | 9/2003 | Takane et al. |
| 2006/0251318 A1 | 11/2006 | Gunji et al. |
| 2007/0210252 A1 | 9/2007 | Miyamoto et al. |
| 2009/0304286 A1 | 12/2009 | Yang et al. |

FOREIGN PATENT DOCUMENTS

| | | |
|---|---|---|
| JP | 2001-243906 A | 9/2001 |
| JP | 2002-328015 A | 11/2002 |
| JP | 2005-61837 A | 3/2005 |
| JP | 2005-106477 A | 4/2005 |
| JP | 2006-300848 A | 11/2006 |
| JP | 2007-250528 A | 9/2007 |
| JP | 2009-216398 A | 9/2009 |

* cited by examiner (a) TEMPLATE (b) SEARCH-TARGET IMAGE EXAMPLE 1

(c) SEARCH-TARGET IMAGE EXAMPLE 2

(a) DESIGN DATA FOR TEMPLATE (b) MASK PROCESSING AREA (c) GENERATION OF MASK PROCESSING AREA (a) DESIGN DATA (b) DESIGN DATA FOR TEMPLATE     (c) MASK PROCESSING AREA (a) TEMPLATE (b) EXAMPLE OF SEARCH-TARGET IMAGE

PATTERN MATCHING METHOD AND PATTERN MATCHING APPARATUS

TECHNICAL FIELD

The present invention relates to a pattern matching technique, particularly to a method and an apparatus for template matching, in which the position of a pattern formed on a sample is specified using an image of the sample and design data of the sample.

BACKGROUND ART

There is known a template matching method in which the position of a pattern is specified based on the degree of coincidence between an image of a sample and a reference image called a template in order to measure and inspect a fine target on the sample. An example of the template matching method has been described in Patent Literature 1 and Non-Patent Literature 1. Moreover, a method for generating a template for template matching based on design data of a semiconductor device has been described in Patent Literature 2.

Further, a method for automatically extracting a characteristic pattern suitable for a template from design data has been disclosed in Patent Literature 3. In addition, a method for generating a template based on design data of a plurality of layers subjected to different processings in order to generate a template on which lower layer information not expressed in design data of a specific layer is reflected in template matching using an image with an optical microscope equipped in a scanning electron microscope used for measurement of a semiconductor device has been described in Patent Literature 4.

A production process for producing a semiconductor device by superposing a plurality of layers of processings on one another has been described in Non-Patent Literature 2.

CITATION LIST

Patent Literature

Patent Literature 1: JP-A-2001-243906(corresponding U.S. Pat. No. 6,627,888)
Patent Literature 2: JP-A-2002-328015 (corresponding U.S. Patent US 2003/0173516)
Patent Literature 3: JP-A-2007-250528 (corresponding U.S. Patent US 2007/0210252)
Patent Literature 4: JP-A-2009-216398

Non-Patent Literature

Non-Patent Literature 1: Mikio Takagi (Supervising Editor) "Handbook of Image Analysis [Revised Edition]", University of Tokyo Press (2004)
Non-Patent Literature 2: Kazuo Maeda, "Semiconductor Processes for Beginners", Kogyo Chosakai Publishing Co., Ltd. (2002)

SUMMARY OF INVENTION

Technical Problem

As described in Non-Patent Literature 2, when a plurality of layers are superposed on one another to form a semiconductor device, a pattern present in a lower layer may be exposed without being covered with an upper layer or may be seen through when the produced device is to be measured or inspected. A template generated by the method as described in Non-Patent Literature 1 and Patent Literature 1 to 3 has a possibility that the degree of coincidence between the template and the actual image is lowered because there is no consideration of the presence of a lower layer pattern.

In addition, a method for generating a template in consideration of information of a lower layer has been described in Patent Literature 4 but cannot handle appearance of a partial pattern of a lower layer.

A template matching method and a template matching apparatus intended to maintain the degree of coincidence between a template and an actual image high upon template matching regardless of partial appearance of a lower layer is described below.

Solution to Problem

As an embodiment for achieving the aforementioned objective, there are proposed a method, an apparatus, and a computer program in which an area of performing no comparison between a template and an image or a second area in which a different comparison is performed from one performed in a first comparison area in the template is set in the template and template matching is executed based on either comparison processing excluding the no-comparison-performed area or comparison processing using the first and second areas.

Advantageous Effects of Invention

According to the aforementioned configuration, the success rate of matching can be maintained high regardless of partial appearance of a lower layer.

DESCRIPTION OF EMBODIMENTS

Figure 1:
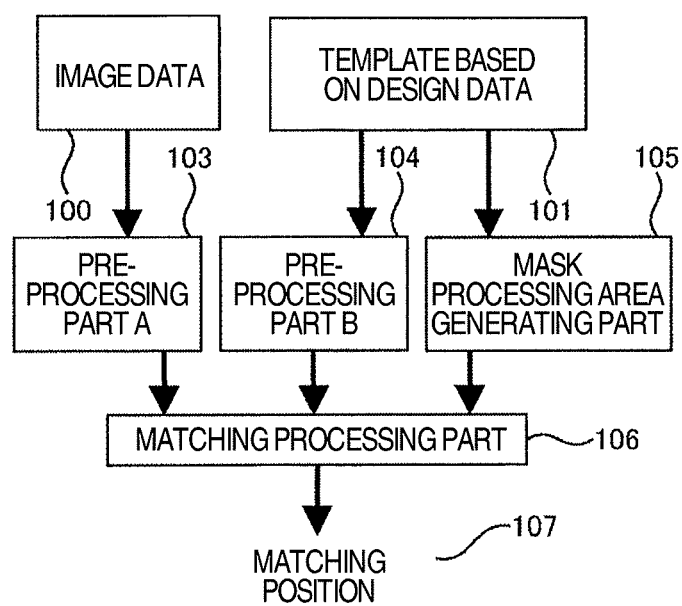
FIG. 1 A chart for explaining an example of a pattern matching apparatus.

In an apparatus of measuring and inspecting a pattern formed on a sample represented by a scanning electron microscope (SEM) or the like, template matching for performing alignment of a field of view to a desired position using template matching technology is a processing in which an area that agrees best with a template image registered in advance is found from a search-target image.

As examples of the measurement and inspection apparatus using template matching, there are an image acquisition apparatus such as an SEM, a focused ion beam (FIB) apparatus for detecting secondary charged particles obtained by irradiation of helium ion or liquid metal ion beam on a sample, and a measurement and inspection apparatus of optical system which irradiates light on a sample. As targets of the measurement and inspection, there are a semiconductor wafer, a photo mask, a magnetic head, a magnetic disk, and a sample having other fine structures.

In an SEM or the like, the field of view of the apparatus is moved to a rough measurement position by stage movement; large misalignment may often occur on an image taken at a high magnification of an electron microscope in accordance with positioning accuracy of the stage alone. Moreover, because a wafer cannot be always mounted on the stage in the same orientation each time, the coordinate system of the wafer mounted on the stage (for example, the arrangement direction of chips or the like on the wafer) may not coincide perfectly with a driving direction of the stage, which causes misalignment on an image taken at a high magnification of an electron microscope.

Template matching is performed for correcting this misalignment and performing measurement and inspection in an accurate position. Specifically, alignment with an optical camera of a lower magnification than of an electron microscope image and alignment with an electron microscope image are performed so that alignment is performed in multiple stages. The case where alignment of the coordinate system of the wafer placed on the stage is performed with an optical camera is described here. Assumed is that alignment is performed using an image of a plurality of chips disposed in separate positions on the wafer (for example, chips at both the left and right ends of the wafer).

The same and unique pattern within or near respective chips (a pattern in the same relative position within respective chips) is first registered as a template (one generated as an optical alignment pattern on a wafer is often used as a pattern used for registration). Then, the stage movement is conducted to capture images of the pattern registered as a template in each chip so that images are acquired in respective chips.

Template matching is performed on the acquired images. The amounts of misalignment in stage movement are calculated based on respective matching positions obtained as result and alignment of the coordinate system of stage movement and the coordinate system of the wafer is conducted with the amounts of misalignment as correction values of stage movement. In alignment with an electron microscope performed next, a unique pattern near the measurement position is registered as a template in advance and the relative coordinates of the measurement position viewed from the template are stored. When the measurement position from an image captured with the electron microscope is obtained, template matching is performed in the captured image to determine a matching position so that a position moved by the stored relative coordinates from there becomes the measurement position. By using such template matching, the field of view of the apparatus is moved to a desired measurement position.

In the aforementioned template matching using a template generated based on design data, a correct matching position is obtained when a pattern to be subjected to matching in a search-target image is similar to the template.

Figure 2:
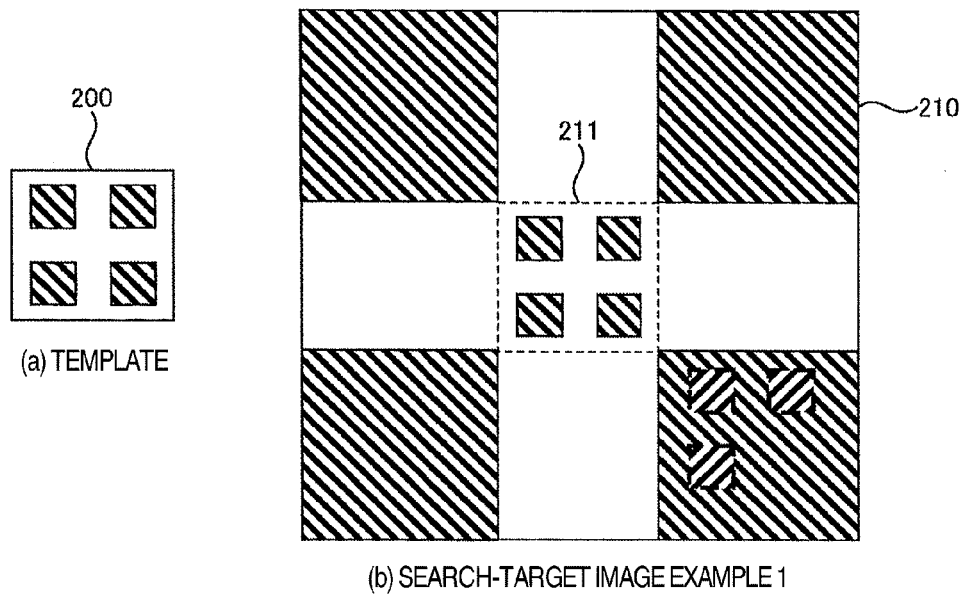
FIG. 2 Diagrams for explaining an example of matching failure in template matching.
Figure 2:
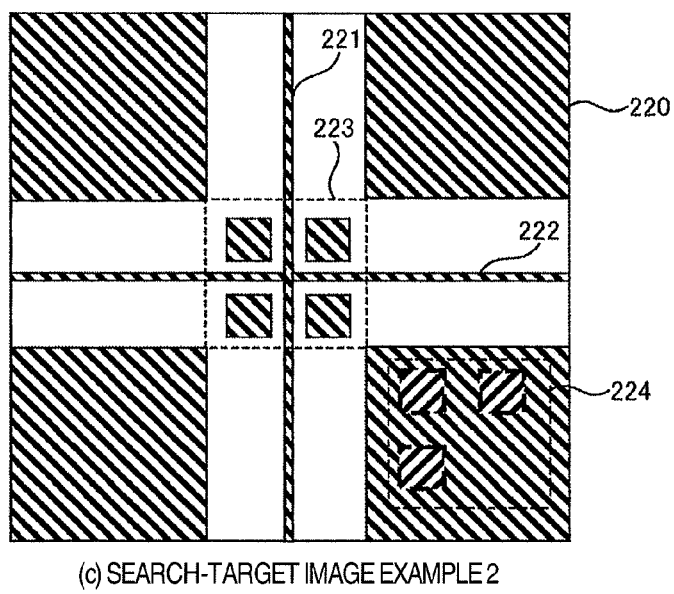

For example, assume an area 211 as an area to be subjected to matching when search is performed using a template 200 exemplified in FIG. 2(a) within a search-target image 210 exemplified in FIG. 2(b). In this case, matching succeeds because the area 211 is most similar to the template 200 in the search-target image 210 so that the area 211 is detected as a matching position.

However, when the search-target image is like one shown in FIG. 2(c), for example, so that there are patterns 221 and 222 or the like not existing in the template 200 in an area 223 to be subjected to matching in the image, there is a possibility that matching would fail because the degree of pattern similarity between the area 223 and the template 200 is lowered. In this example, an area 224 becomes more similar to the template 200 than the area 223 in the pattern so that the area 224 is detected falsely as a matching position. When matching fails, there is a possibility that the success rate of the aforementioned alignment is decreased.

Particularly in semiconductor production, layers of a plurality of processings may often be superposed on one other to produce a device and a pattern in a lower layer may be exposed without being covered with a processing layer of an upper layer or may be seen through the upper layer when it is observed with an inspection apparatus or the like. In the case of a template generated using design data, a pattern not present in the template appears in a search-target image as an example of FIG. 2(c) because the template is generated from layout data of a single layer or a plurality of layers.

Because there is a possibility that an appearing pattern varies according to process variation, optical conditions of the electron microscope, or the like, the success rate of matching is not always improved, for example, even when layout data of a lower layer is simply superposed to generate a template.

A method and an apparatus capable of suppressing failure of template matching are described in the case where a pattern not present in the template appears in the search-target image hereinafter.

A pattern matching apparatus described in this example comprises: a mask processing area generating part which applies a mask area partially on a template subjected to template matching; a pre-processing part which pre-processes a search-target image; a pre-process part which pre-processes the template; and a template matching processing part which determines a matching position using the pre-processed search-target image, the pre-processed template, and the mask processing area. Besides, not limited to the aforementioned pattern matching apparatus, other pattern matching apparatuses are also described. Incidentally, as for an area subjected to the aforementioned mask processing a representative example is rendered so that only an area having a constant width along an edge position of a pattern existing in the template is set as an area subjected to correlation calculation in matching processing while the other area is set as an area not subjected to correlation calculation.

By applying a mask partially on the template, an accurate matching position can be determined in template matching even when a pattern not present in the template is contained in the search-target image.

An apparatus and a system for executing template matching and a computer program executed in them (or a storage media for storing the computer program) are described below with reference to the drawings. More specifically, an apparatus and a system including a critical dimension-scanning electron microscope (CD-SEM) as a kind of measuring apparatus and a computer program executed in them are described.

Further, a method for forming a composite image explained below can be applied not only to an apparatus for measuring pattern dimensions but also to an apparatus for inspecting a pattern defect. Incidentally, although in the following description a charged particle beam apparatus is exemplified as an apparatus for forming images and an example using an SEM as an embodiment thereof are described, it is not limited thereto; for example, a focused ion beam (FIB) apparatus for forming an image by scanning an ion beam on a sample may be adopted as a charged particle beam apparatus. It is, however, desirable that an SEM generally superior to an FIB apparatus in view of resolution is used because an extremely high magnification is required for measuring a pattern for which refinement progresses with high accuracy.

Figure 15:
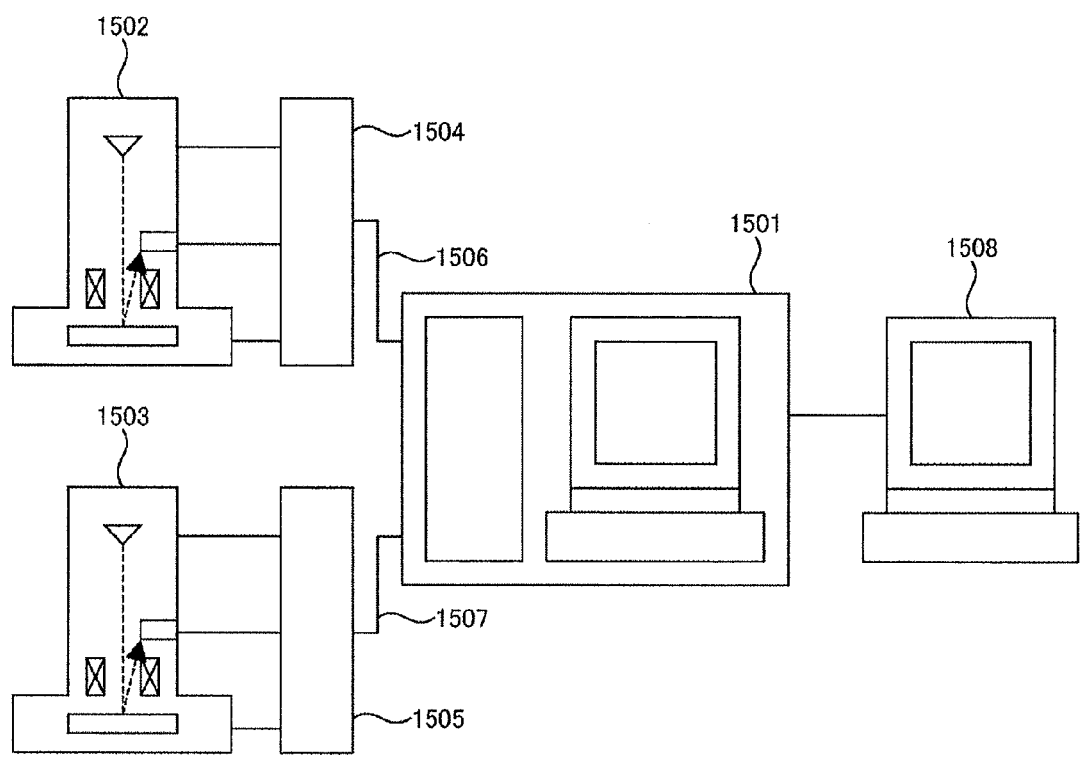
FIG. 15 A diagram for explaining an example of a measurement system in which a plurality of SEMs are connected.

FIG. 15 exemplifies a system in which a plurality of SEMs are connected with a data management apparatus 1501 at the center. Particularly in the present embodiment, an SEM 1502 is mainly used for measuring and inspecting a pattern of a photo mask or a reticle used in a semiconductor exposure process and an SEM 1503 is mainly used for measuring and inspecting a pattern transcribed onto a semiconductor wafer by light exposure using the photo mask or the like. The SEM 1502 and the SEM 1503 do not differ largely in terms of the basic structure of the electron microscope but are configured respectively in accordance with a difference in sizes of the semiconductor wafer and the photo mask and a difference in tolerance to electrostatic charge.

Control apparatuses 1504 and 1505 are connected to the SEMs 1502 and 1503, respectively so that control required for each SEM is performed. In each SEM, an electron beam emitted from an electron source is focused by lenses of a plurality of stages and the focused electron beam is scanned on a sample one-dimensionally or two-dimensionally by a scanning deflector.

Secondary electrons (SEs) or backscattered electrons (BSEs) emitted from the sample by electron beam scanning are detected by a detector and stored in a storage medium such as a frame memory in synchronization with scanning by the scanning deflector described above. Image signals stored in this frame memory are accumulated by an arithmetic unit equipped in the control apparatus 1504 or 1505. Further, scanning by the scanning deflector can be made with respect to arbitrary sizes, positions, and directions.

The aforementioned control or the like is performed by each SEM control apparatus 1504 or 1505 and images and signals obtained as result of electron beam scanning are sent to the data management apparatus 1501 through communication lines 1506 and 1507. Incidentally, even though in the present example the control apparatuses for controlling SEMs and the data management apparatus for performing measurement based on signals obtained by the SEMs are described separate, it is not limited thereto; apparatus control and measurement processing may be performed collectively by the data management apparatus or SEM control and measurement processing may be performed in combination by each control apparatus.

Also in the aforementioned data management apparatus or each control apparatus, a program for executing measurement processing is stored so that measurement or calculation is performed in accordance with the program. Further, design data for photo masks (which may be hereinafter referred to simply as "masks") and wafers used in a semiconductor production process are stored in a design data management apparatus. The design data are expressed, for example, in GDS format, OASIS format, or the like and stored in a predetermined form. Incidentally, the kind of the design data is not questioned as long as software for displaying design data can display the format type and can handle as graphical data. Alternatively, the design data may be stored in a storage medium provided separately from the data management apparatus.

In addition, the data management apparatus 1501 has a function of generating a program (recipe) for controlling operation of an SEM based on semiconductor design data so that it serves as a recipe setting part. Specifically, positions for execution of necessary processings for an SEM and the like such as desired measurement points and points for autofocus, automatic astigmatism correction, and addressing are set on design data, pattern outline data, or simulated design data so that a program for automatically controlling the sample stages, deflectors, and the like of an SEM is generated based on the settings. Incidentally, a template matching method using a reference image called a "template" is a method in which a template is moved in a search area for searching for a desired spot to identify a spot where the degree of coincidence with the template is highest or the degree of coincidence is equal to or more than a predetermined value in the search area. Each of the control apparatuses 1504 and 1505 executes pattern matching based on the template which is one of registration information of a recipe. A program for performing matching using a normalized correlation method or the like is stored in each of the control apparatuses 1504 and 1505 so that each of the control apparatuses 1504 and 1505 serves as a computer for executing the program.

Incidentally, a focused ion beam apparatus for irradiating helium ions, liquid metal ions, or the like onto a sample may be connected to the data management apparatus 1501. In addition, a simulator 1508 for simulating finish of a pattern based on design data may be connected to the data management apparatus 1501 so that a simulation image obtained by the simulator is converted to a GDS and used in place of design data.

FIG. 1 is a chart for explaining an example in which mask processing is partially applied to a template to thereby provide an area not subjected to correlation calculation or the like in the template so that template matching is performed with the template provided with the area. Description is given on the assumption that matching processing or the like as exemplified in FIG. 1 is performed, for example, in the control apparatuses 1504 and 1505 or the data management apparatus 1501; it is not limited thereto and, for example, it may be performed in another arithmetic processing apparatus. In the present embodiment, template matching is performed with image data 100 of a search-target area acquired by an image acquisition apparatus such as a scanning electron microscope and a template 101 extracted out from design data so that a matching position 107 is calculated ultimately.

A method described below is intended to detect a correct matching position even when a pattern not present in a template appears in a correct matching position of a search-target image so that there is a possibility that matching based on a general matching method would fail because the degree of pattern similarity is lowered as described above; and for this reason, the area in which a pattern not present in the template would appear is set as an area not subjected to correlation calculation of matching processing (Non-Patent Literature 1, pp. 1672) (hereinafter, referred to as a mask area). By this setting, information of the mask area is stored in a predetermined storage medium as the mask area is an area not subjected to correlation calculation. In this manner, even when a pattern not present in the template appears in the search-target image (namely, the pattern appears in the mask area), a matching result won't be affected by the influence thereof so that a correct matching position can be detected. This mask area setting is performed in the mask processing area generating part 105.

Figure 3:
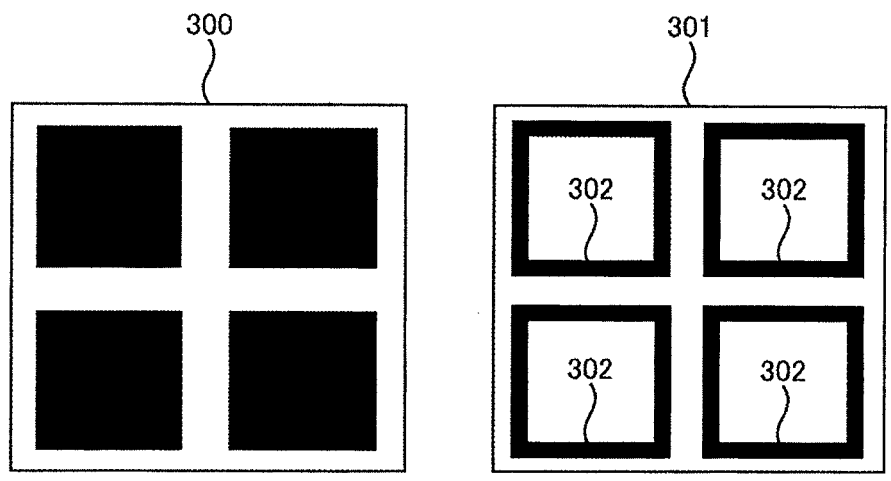
FIG. 3 Diagrams for explaining an example of a method for generating a mask processing area by using edge information of design data.
Figure 3:
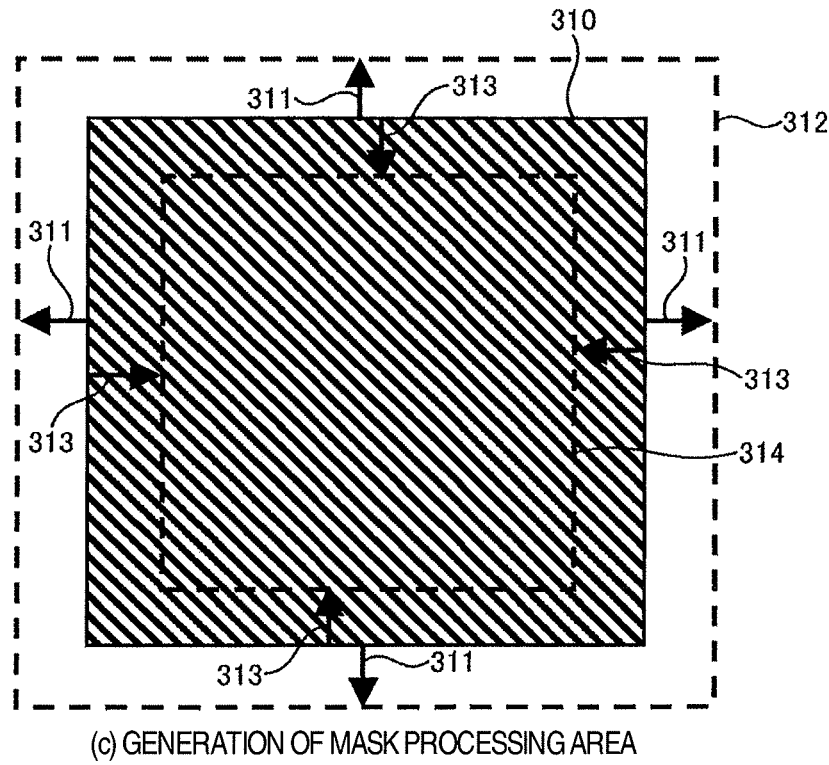

For example, as exemplified in FIG. 3, processing is performed to make a portion at a defined distance or longer from an edge portion of a pattern area in a template as a mask area. Also in the pre-processing part A 103 the image data 100 is subjected to a processing of reducing noise contained in the image, an edge enhancement processing for enhancing a pattern shape, or the like to make the matching processing 106 in the subsequent stage robust. Also in the pre-processing part B 105 the template is subjected to edge processing for enhancing a pattern shape or the like to make the matching processing 106 in the subsequent stage robust. Using the pre-processed search-target image, the pre-processed template, and the mask processing area template matching is performed in the matching processing part 106 to output a matching position 107. This matching position becomes as a correct matching position even when a pattern not present in the template appears in a position where matching is supposed to be correct in the search-target image.

Hereinafter, specific contents of the process of template matching processing are described. In the pre-processing part A 103 a processing of reducing influences of noise contained in the image on the matching processing is performed. For example, a noise reduction processing such as Gaussian filter processing or median filter processing (Non-Patent Literature 1, pp. 1670) is performed as processing. Incidentally, the noise reduction processing is not limited thereto and any processing may be used as long as noise can be reduced. Moreover, an edge enhancement processing is performed for enhancing a pattern shape. For example, Sobel filter processing (Non-Patent Literature 1, pp. 1215) or the like is performed. Incidentally, the edge enhancement processing is not limited thereto either and any processing may be used as long as edge enhancement can be performed. Both the noise reduction processing and the edge enhancement processing in the pre-processing part A 103 are not performed necessarily; it is possible either or any of them is not performed.

In the pre-processing part B 104 an edge enhancement processing for enhancing the pattern shape of design data is performed. For example, Sobel filter processing (Non-Patent Literature 1, pp. 1215) or the like is performed. Incidentally, the edge enhancement processing is not limited thereto and any processing may be used as long as edge enhancement can be performed. Also regarding this processing in the pre-processing part B, it need not be performed necessarily and it is possible this processing is not executed.

Figure 4:
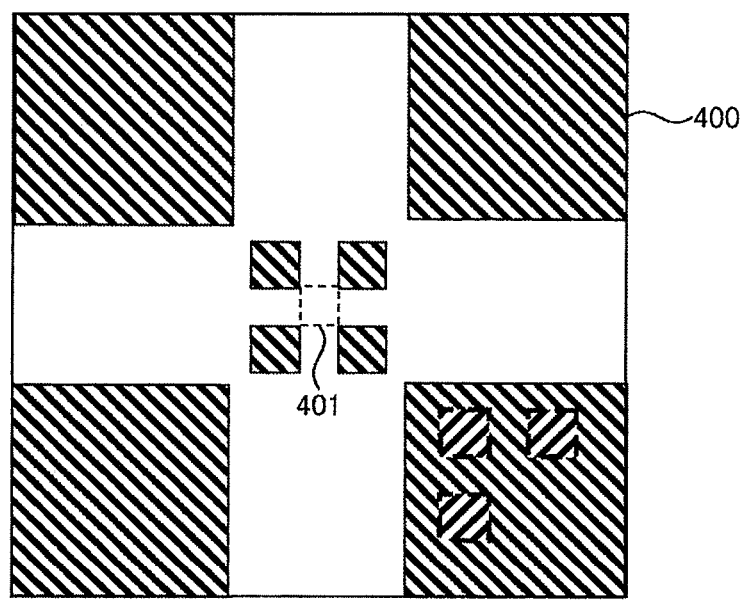
FIG. 4 Diagrams for explaining another method for generating a mask processing area.
Figure 4:
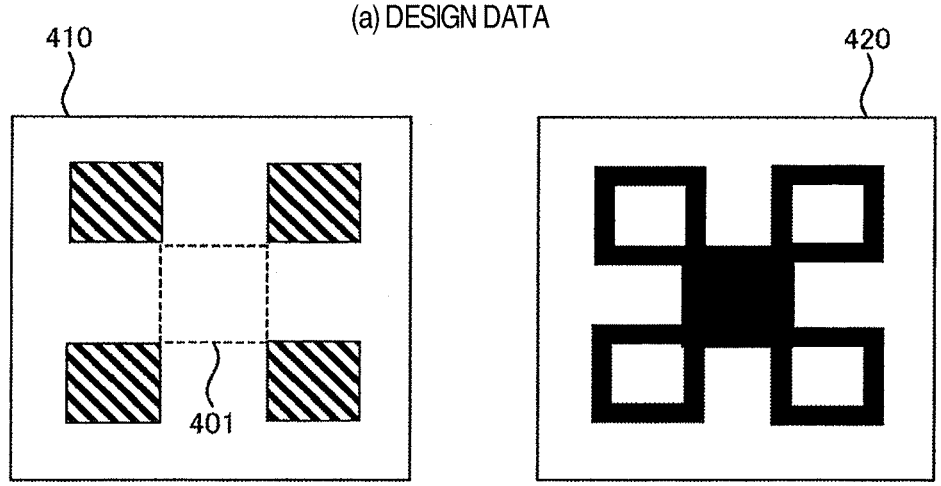
Figure 5:
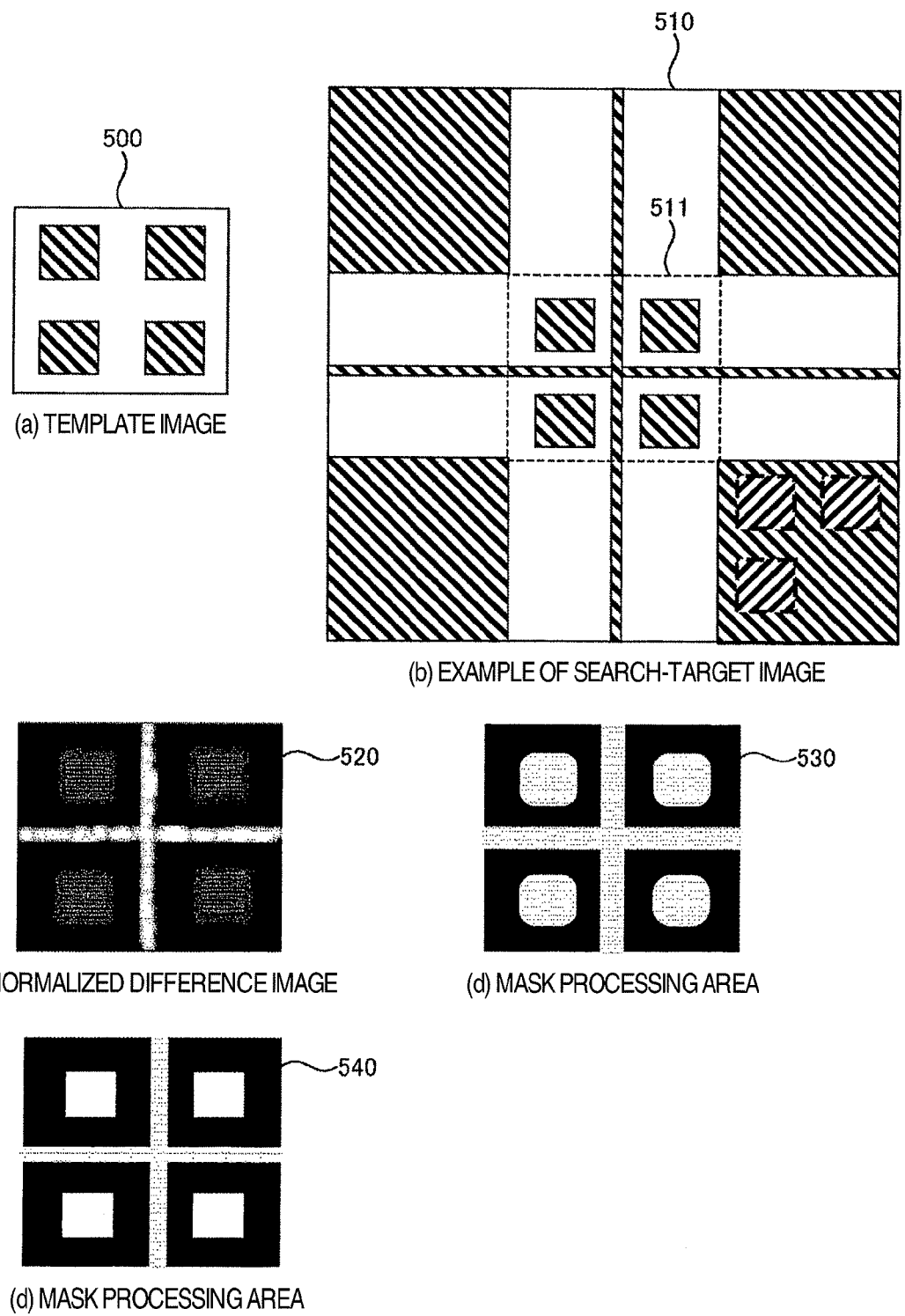
FIG. 5 Diagrams for explaining still another method for generating a mask processing area.

In the mask processing area generating part 105 a mask processing area is generated with a method exemplified in FIGS. 3 to 5 based on design data. A mask set in the mask processing area generating part 105 shows an area not subjected to correlation calculation (Non-Patent Literature 1, pp. 1670) in the template matching processing 106 in the subsequent stage; the area is for distinguishing between areas subjected to and not subjected to comparison processing such as correlation calculation.

In the following description, as long as there is no particular notice, an area not subjected to correlation calculation is referred to as a "mask area", an area subjected to correlation calculation is referred to as "unmask area", and information of both the mask area and the unmask area is referred to as "mask information".

As an unmask area a vicinity of a portion having an edge of a pattern in the template, for example, is designated whereas an area away from a vicinity of a portion having an edge of a pattern, for example, is designated as a mask area. In this manner, when mask information is used, template matching becomes possible in which only a pattern in the template is enhanced. In the matching processing part 106 template matching (Non-Patent Literature 1, pp. 1670) is performed. For example, matching processing using a normalized correlation method (Non-Patent Literature 1, pp. 1672) is performed. As described above, it would not be a general method in which a correlation value is calculated in the entire area of the template but a correlation value is calculated only in an unmask area which is mask information generated based on design data. In this manner, since matching is performed only in an unmask area, matching becomes possible without influences of a pattern in an area (i.e. a mask area) other than the unmask area and, even when a pattern not present in the template exists in the search-target image, success of matching is enabled.

FIG. 3 shows diagrams for explaining an example of a method for setting a mask processing area based on design data in the mask processing area generating part 105 described with reference to FIG. 1. FIG. 3(*a*) shows an example of a template 300 extracted from design data. A mask processing area is generated from this template in a method which is described next so that a vicinity of an edge portion of a pattern in the template is set as an unmask area and the other area is set as a mask area. FIG. 3(*b*) shows an example of a mask processing area generated based on the template 300. Portions 302 shown in black are unmask areas, whereas the other portions shown in white are mask areas. The black and white are shown only for distinguishing between the two areas for the sake of description and it is not intended to limit to theses colors. Respective areas may be stored so that the two areas can be distinguished in the image data. For example, when a pixel value "1" is stored in every mask area while a pixel value "0" is stored in every unmask area, it is possible to distinguish between the two areas.

Next, FIG. 3(*c*) is a diagram for explaining an example of a method for setting a mask processing area. A method for generating this mask processing area is described provided that a pattern in a template extracted from design data is set as a pattern 310 and an unmask area generated from the pattern 310 is set as an area put between a broken line portion 312 and a broken line portion 314. First, the pattern 310 is subjected to expansion processing (Non-Patent Literature 1, pp. 1528) to generate a pattern having the size of the broken line portion 312.

An expansion size 311 on this occasion is given, for example, as a pixel value and, for example, as several pixels. Next, the pattern 310 is subjected to contraction processing (Non-Patent Literature 1, pp. 1528) to generate a pattern having the size of the broken line portion 314. A contraction size 313 on this occasion is given, for example, as a pixel value and, for example, as several pixels. By taking a difference between the pattern generated by the expansion processing and the pattern generated by the contraction processing, an area put between the broken line portion 312 and the broken line portion 314 can be set. This area becomes an unmask area. The generated unmask area is an area obtained by widening with an edge portion of the pattern 310 at the center by the widths of the expansion size and the contraction size; that is, a vicinity area of the edge portion of the pattern 310 can be set as an unmask area while the other area can be set as a mask area. In the aforementioned manner, a mask processing area is generated. Incidentally, the method for generating the mask processing area is not limited thereto and any process may work as long as it can set the vicinity area of the edge portion of the pattern 310 as an unmask area while it can set the other area as a mask area. For example, a mask area with an arbitrary size may be set and the other portion than the set mask area may be set as an unmask area.

FIG. 4 shows diagrams for explaining another method for generating a mask processing area from design data. The method exemplified in FIG. 3 is a method for selectively setting the vicinity of the pattern edge portion of the template as an unmask area. In addition to the method described with reference to FIG. 3, a method for extending the unmask area is described here. In this example, a method is described in which an area having no pattern edge or the like and being known to have no appearance of patterns on the search-target image is set as an unmask area. The robustness of template matching using normalized correlation is further improved with this method.

In similarity judgment using a normalized correlation method or the like, not only the degree of similarity in a pattern portion but also the degree of similarity in a portion without a pattern is evaluated (Non-Patent Literature 1, pp. 1672); it can be pointed out as a reason of improvement of robustness that an area contributing to similarity judgment can be enlarged when an area excluded from comparison judgment due to matching is small.

FIG. 4(a) is a diagram for explaining an example of design data and FIG. 4(b) exemplifies an example of a template obtained by extracting a part of design data 400. Assume that an area 401 in a template 410 exemplified in FIG. 4(b) is an area where no pattern would appear even when a semiconductor device is produced via a plurality of semiconductor production processes. That is, assume that it is an area that lower layer patterns won't appear on the image.

This area can be obtained by logical product of areas having no pattern appearing while design data in each process are examined. The process for calculating the logical product on this occasion may use design data in all processes or may selectively use, as objects of logical product calculation, design data in a process for forming a layer as a target of measurement or inspection and in the processes by a predetermined number of steps prior to the process. In the latter, an unmask area can be kept large by not including patterns of processes not appearing in the process of measuring or inspecting into the logical product operation.

A composite area of the thus obtained unmask area (area 401) having no appearance of patterns and the unmask areas in the vicinities of the edge portions of the patterns described with reference to FIG. 3 becomes a mask processing area 420 exemplified in FIG. 4(c).

Similar to the description with reference to FIG. 3, a portion shown in black is an unmask area while the other portions shown in white are mask areas. The black and white are shown only for distinguishing between the two areas for the sake of description and it is not intended to limit to these colors. Pixel values of respective areas may be stored so that the two areas can be distinguished in the image data. For example, when a pixel value "1" is stored in every mask area while a pixel value "0" is stored in every unmask area, it is possible to distinguish between the two areas.

FIG. 5 shows diagrams for explaining still another method for generating a mask processing area based on design data. The method already described with reference to FIG. 3 is a method for selectively setting the vicinity of the pattern edge portion in the template as an unmask area. In this example, in addition to the method described with reference to FIG. 3, a method for extending the unmask area is described. In this method, an area of high correlation in a normalized correlation method (Non-Patent Literature 1, pp. 1672) is aggressively set as an unmask area.

In this manner, a correlation value in a matching position candidate area which has many portions similar to the template in the search-target area can be increased. Particularly, because it is general that the correct matching position has a large number of areas similar to the template, a correlation value in the correct matching position can be increased with this method so that robustness of matching may be improved.

A specific example of the execution method is described. Incidentally, in this example, an unmask area is generated with movement of the template at execution of search processing of matching (Non-Patent Literature 1, pp. 1669). Namely, the unmask area changes dynamically during matching processing.

FIG. 5(a) is a diagram for explaining an example of a template image and FIG. 5(b) is a diagram for explaining an example of a search-target image subjected to searching with a template 500. In template matching, the template 500 is moved on the search-target image 510 to thereby search on the search-target image 510 for a position which has a high degree of coincidence with the template 500. In this example, an example is shown in which an unmask area is generated when the template is located in an area 511 in FIG. 5(b). Here, the unmask area is generated using an image called normalized difference image which is described next. The normalized difference image is one in which difference information in normalized correlation operation (Non-Patent Literature 1, pp. 1672) is expressed in the unit of each pixel and is represented by the expression 1 (in which f( ) and g( ) show images and x and y show coordinates of pixels forming the images) for the template image 510 f(x, y) and the search-target image 511 g(x, y).

$\bar{f}$ and $\bar{g}$ are average values of the images f(x, y) and g(x, y), respectively, and const is a constant for making the normalized difference image Ndif as an integer.

(Expression 1)

Normalized Difference Image [MATH. 1]

$$Ndif(x, y) = \left\{ \frac{f(x, y) - \bar{f}}{\sqrt{\sum (f(x, y) - \bar{f})^2}} - \frac{g(x, y) - \bar{g}}{\sqrt{\sum (g(x, y) - \bar{g})^2}} \right\}^2 \times const$$

In FIG. 5(c) a normalized difference image 520 is exemplified. In the normalized difference image, an area of a high image brightness value is an area of a low degree of similarity whereas an area of a low image brightness value is an area of a high degree of similarity. As described above, a portion of a high degree of similarity is set as an unmask area. For example, the normalized difference image is subjected to a binarization process (Non-Patent Literature 1) so that a portion having low brightness values equal to or less than a binarization threshold is set as an unmask area and a portion having high brightness values larger than the binarization threshold is set as a mask area. FIG. 5(d) shows an example of a mask processing area 530 generated in the aforementioned manner. Similarly to the description with reference to FIG. 3, portions shown in black are unmask areas while the other portions shown in white are mask areas. The mask processing area ultimately generated is a mask processing area 540 shown in FIG. 5(*e*) by taking logical product of the mask processing area described with reference to FIG. 3 and the mask processing area described with reference to FIG. 5.

Incidentally, the mask processing area may be generated by combination of all or part of areas in FIGS. 3, 4, and 5. It is possible the combination is selected by a user through a GUI which is described with reference to FIG. 12.

Figure 6:
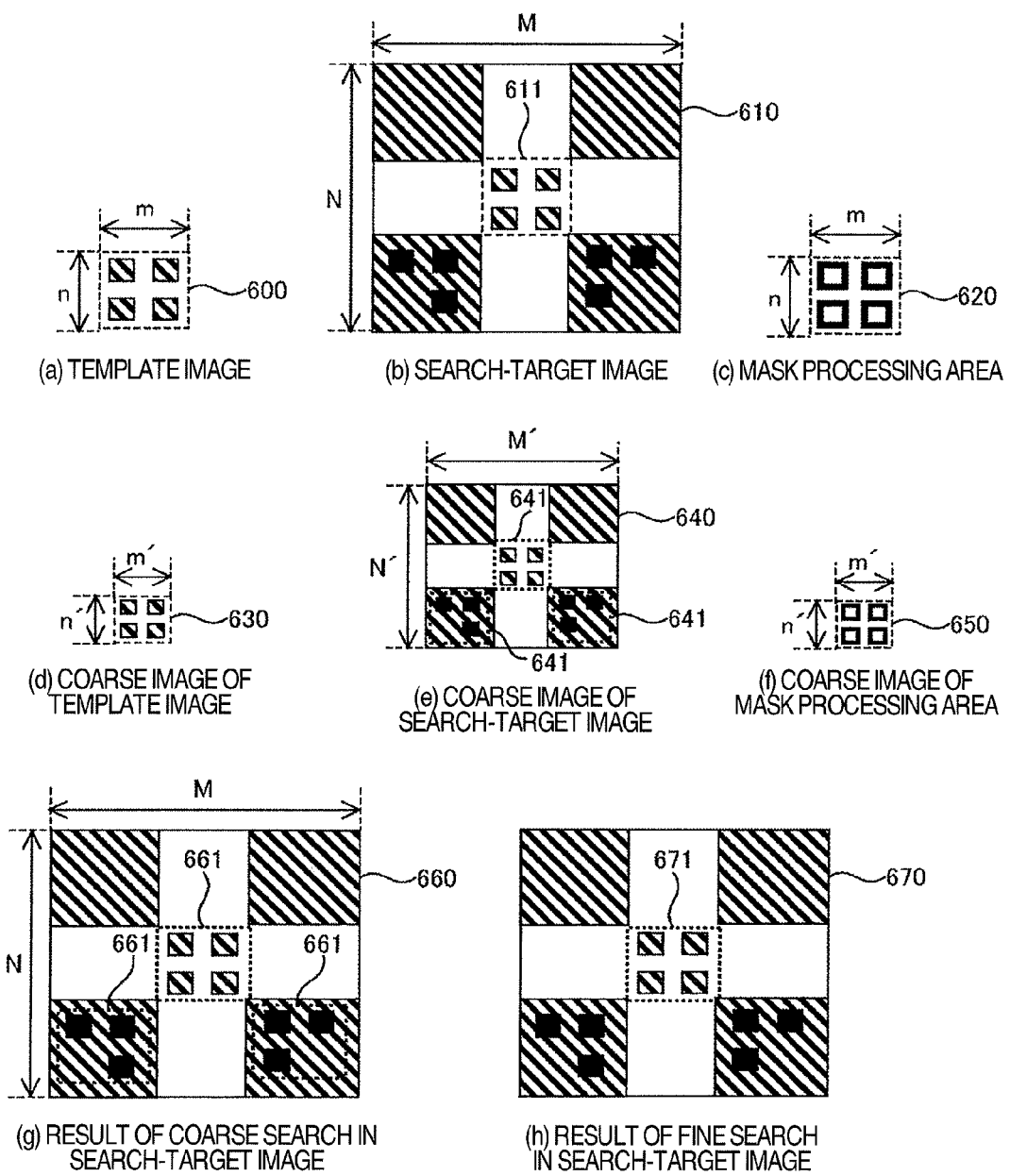
FIG. 6 Diagrams for explaining an example of coarse-to-fine search using mask processing.

FIG. 6 shows diagrams for explaining a method for performing a coarse-to-fine search in template matching processing using mask processing. A method for performing a coarse-to-fine search in order to perform stable processing or low-cost processing in matching processing has been proposed (Non-Patent Literature 1, pp. 1678, coarse-to-fine matching).

Also in template matching using a template subjected to mask processing, a coarse-to-fine search can be performed. Incidentally, a coarse-to-fine search is not necessary to be performed and it is possible template matching is performed without conducting coarse-to-fine search. FIG. 6(*a*) shows a template 600 (the image width of m[pix] and the height of n[pix]) and FIG. 6(*b*) shows a search-target image 610 (the image width of M[pix] and the height of N[pix]).

In a coarse search, low resolution images are generated from the template 600 and the search-target image 610. Template matching is performed using the generated coarse image 630 (the image width of m'[pix] and the height of n'[pix] (where m'<m and n'<n)) of the template and the generated coarse image 640 (the image width of M'[pix] and the height of N'[pix] (where M'<M and N'<N)) of the search-target image. On this occasion, template matching with mask processing is performed using a mask area image 650 generated from the coarse image 630 of the template with any one of the methods described with reference to FIGS. 3, 4, and 5 or by combination thereof. Incidentally, the mask area image 650 may also be generated by lowering resolution of the mask area image 620 generated from the template image 600 with any one of the methods described with reference to FIGS. 3, 4, and 5 or by combination thereof.

Matching candidates calculated by template matching using mask processing by use of the coarse image 630 of the template image, the coarse image 640 of the search-target image, and the coarse image 650 of the mask processing area, all of which are generated, are shown as portions 641 of broken lines in FIG. 6(*e*). Although the number of matching candidates in this example is three, the number of candidates is not limited to three and a number of 1 or more can be designated. Incidentally, matching candidates are selected in a descending order of a matching score.

The matching score described here is an index of the degree of coincidence between the template and each candidate image obtained from the search-target image in matching processing and, for example, a correlation value or the like in a normalized correlation method is used. Incidentally, the matching score is not limited to the correlation value and it may be any value indicating the degree of coincidence between the template and the candidate image obtained from the search-target image.

Then, the matching position of each matching candidate 641 obtained in the coarse image 640 of the search-target image is converted to a position 661 in the original search-target image 660. Now, template matching is performed in the vicinity area of the matching candidate 661 in the original high-resolution image. As matching processing, template matching using mask processing is performed by use of the original template 600, the search-target image 610, and the mask processing area 620 generated from the template. An area to be searched in the vicinity of the matching candidate 661 on this occasion is determined based on a sampling rate at the time of lowering resolution in a coarse search and a desired processing time. For example, several pixels in the vicinity of the candidate area 661 are set as a search area.

In results of the template matching the matching position in the candidate having the highest score becomes an ultimate matching position 671. Although an example of matching in two, coarse and fine, stages has been described in template matching using this coarse-to-fine search, search in multiple stages (Non-Patent Literature 1, pp. 1678) may also be used.

Figure 7:
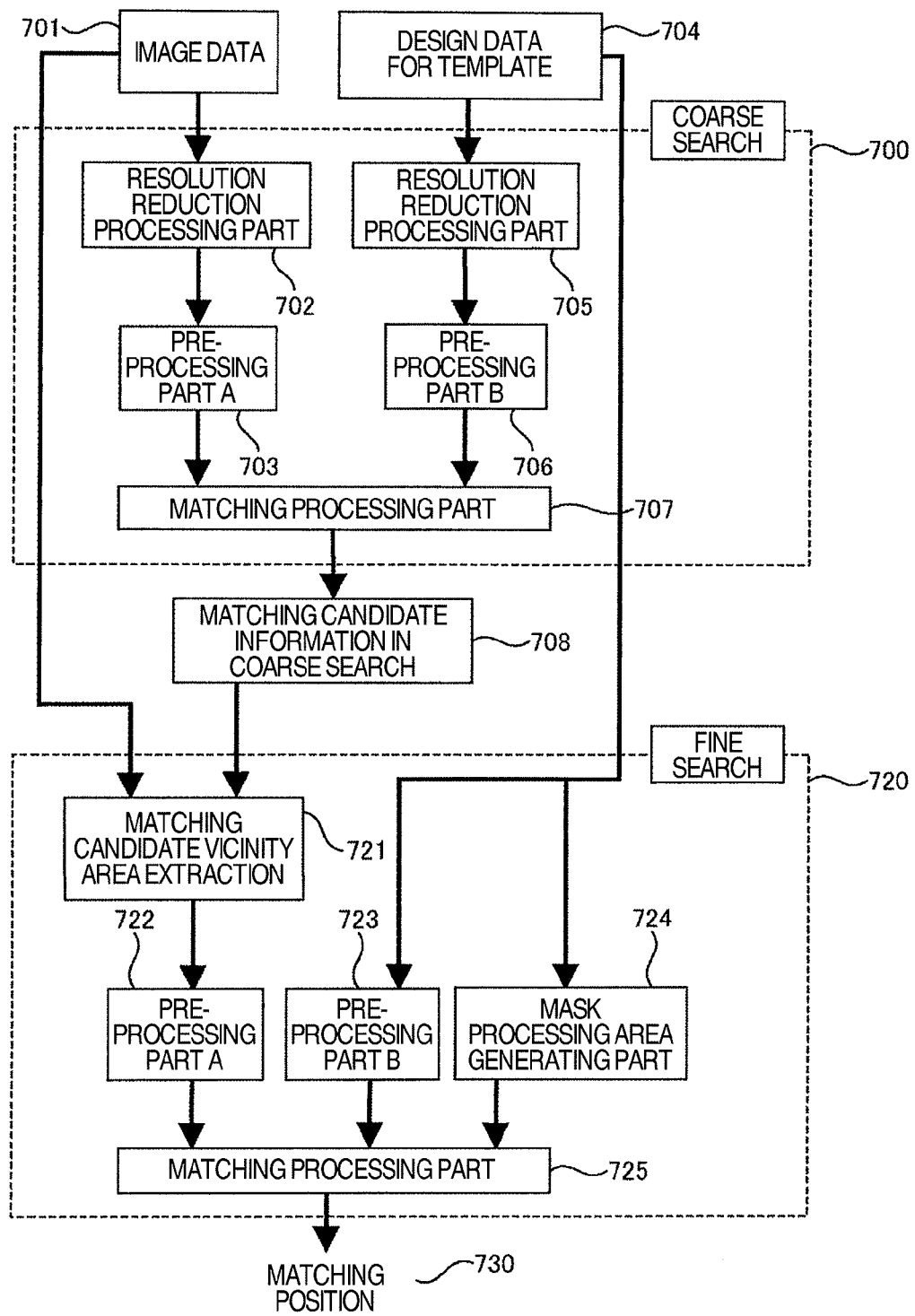
FIG. 7 A chart for explaining another example of coarse-to-fine search using mask processing.

FIG. 7 is a chart for explaining a second method of coarse-to-fine search in template matching processing using mask processing. In matching processing using a mask processing area, the processing time may become long when processing is performed while the mask processing area described with reference to FIG. 5, for example, is generated dynamically. When the processing time of matching processing becomes long in an inspection apparatus, throughput of measurement or inspection may be lowered. As a method for solving this, a process of changing matching processing may be performed between a coarse search and a fine search in a coarse-to-fine search.

Specifically, template matching using mask processing as described above is performed only in a fine search whereas template matching not conducting mask processing is performed in a coarse search. An example of a method for performing it is described with reference to FIG. 7. First, a coarse search 700 is performed. A search-target image 701 is converted into a low-resolution image in a resolution reduction processing part 702 in the same manner as described with reference to FIG. 6. In a pre-processing part A 702, noise reduction processing and edge enhancement processing are performed in the same manner as processings in the pre-processing part A in FIG. 1. Incidentally, it is possible either or any of noise reduction processing or edge enhancement processing is not performed.

Also for design data 704 for template it is converted into a low-resolution image in a resolution reduction processing part 705 in the same manner as described with reference to FIG. 6. In a pre-processing part B 706, edge enhancement processing is performed. Incidentally, it is possible that edge enhancement processing is not performed. Template matching is performed in a matching processing part 707 using the search-target image subjected to resolution reduction and pre-processing and the template subjected to resolution reduction and pre-processing. As a result, matching position candidates 708 in the coarse search can be calculated.

In this manner, template matching without performing mask processing is performed in the coarse search 700. Then, a fine search is performed. First, a matching area of each matching candidate obtained in the coarse search is converted into an area in the original search-target image 701. Then, template matching is now performed in the vicinity of the matching candidate in the original high-resolution image. Extraction of an area in the vicinity of the matching candidate is performed in a matching candidate vicinity area extraction part 721 using the search-target image 701 and the matching candidate 708 in the coarse search. The area to be extracted here is determined based on a sampling rate for lowering resolution in the coarse search and a desired processing time. For example, several pixels in the vicinity of the candidate area are set as an area. The extracted area is subjected to noise reduction processing and edge enhancement processing in a pre-processing part A 722 in the same manner as described with reference to FIG. 1.

Then, the original template 704 is subjected to edge enhancement processing in a pre-processing part B 723 in the same manner as described with reference to FIG. 1. In the fine search, a mask processing area is generated in a mask processing area generating part 724 using the template data 701 in order to perform template matching processing with mask processing being performed. The mask generating processing here is performed with any one of the methods described with reference to FIGS. 3, 4, and 5 or in combination thereof. Finally, template matching is performed in a matching processing part 725 using the pre-processed search-target image, the pre-processed template, and the mask information. As a result, a matching position 730 can be calculated. In this manner, it is possible to perform a method of performing template matching using mask processing only in a fine search in a coarse-to-fine search so that matching processing can be performed at a high speed.

Incidentally, even though a template is generated by partial extraction of design data (layout data) in the aforementioned example, it is not limited thereto; for example, simulation using the simulator 1508 exemplified in FIG. 15 may be applied to design data and a part of the simulation image may be extracted to make a template. By using outline information obtained by the simulator, a mask area or an unmask area in accordance with a state of formation of a real pattern can be set.

Figure 8:
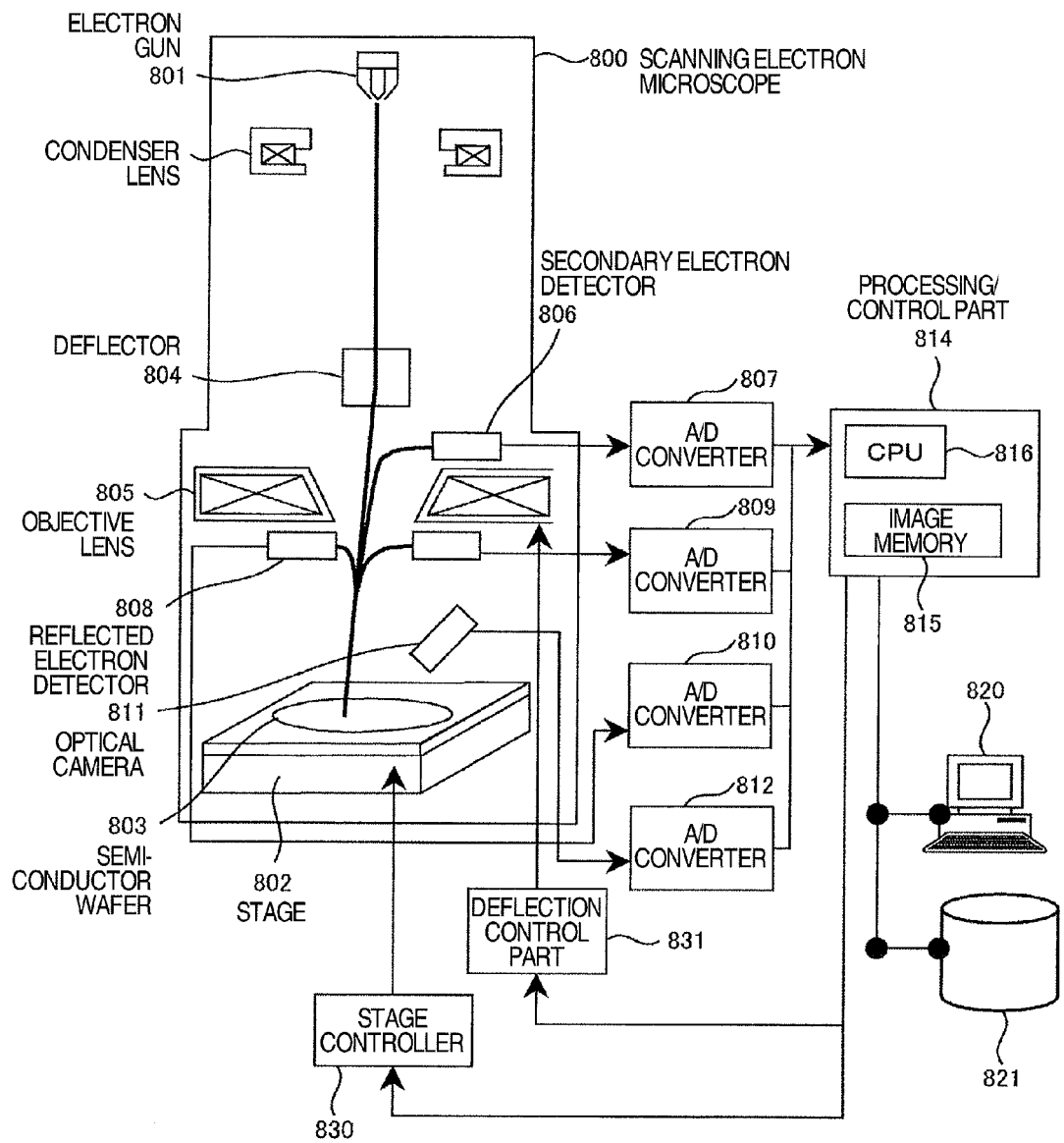
FIG. 8 A diagram for explaining an outline of a scanning electron microscope.

FIG. 8 is a diagram for explaining an outline of an SEM. In the SEM, an electron beam is generated from an electron gun 801. A deflector 804 and an objective lens 805 are controlled so that the electron beam is focused and irradiated on an arbitrary position on a semiconductor wafer 803 which is a sample placed on a stage 802. From the semiconductor wafer 803 irradiated with the electron beam secondary electrons are emitted and detected by a secondary electron detector 806. The detected secondary electrons are converted into a digital signal by an A/D converter 807, stored in an image memory 815 in a processing/control part 814, and subjected to image processing in a CPU 816 in accordance with a purpose.

Figure 12:
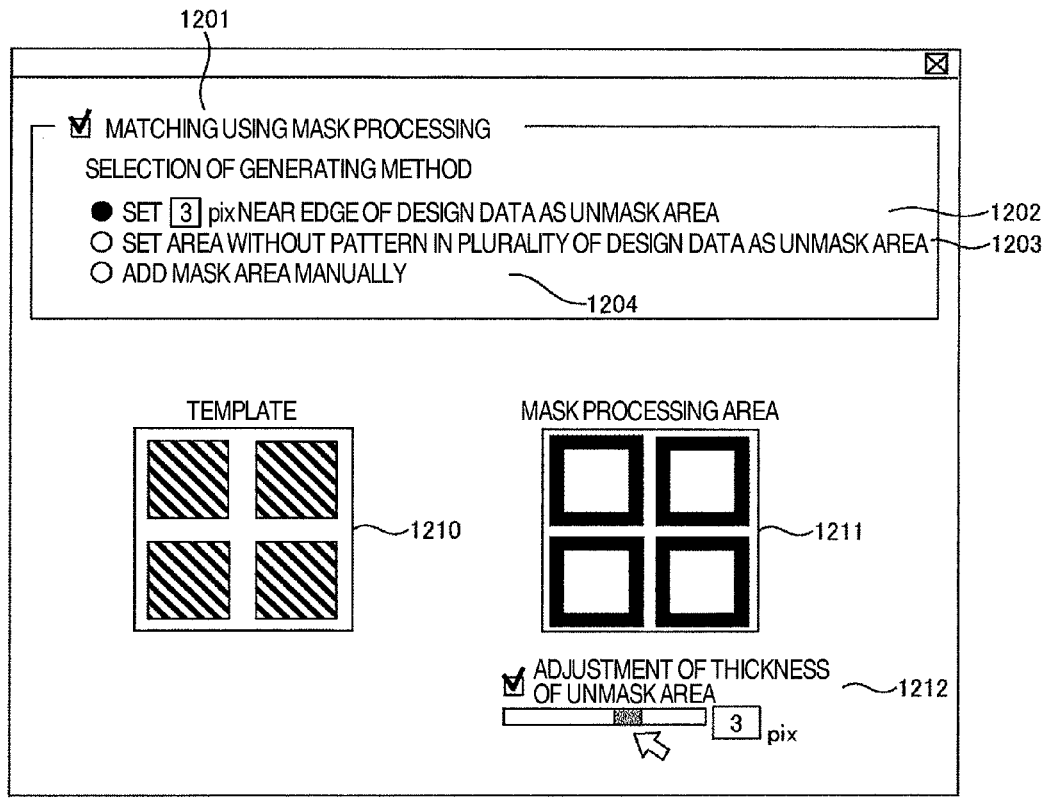
FIG. 12 A view for explaining a GUI (Graphical User Interface) screen for setting a mask processing area.

As for template matching processing is performed in the processing/control part 814. Display of setting of processing and a processing result described with reference to FIG. 12 is conducted at a display device 820. Also in alignment using a lower-magnification optical camera than the electron microscope described above, an optical camera 811 is used. A signal obtained by capturing an image of the semiconductor wafer 803 with this camera is also converted into a digital signal by an A/D converter 812 (while the A/D converter 812 becomes unnecessary when the signal from the optical camera is a digital signal), stored in the image memory 815 in the processing/control part 814, and subjected to image processing in the CPU 816 in accordance with a purpose. Further, when a reflected electron detector 808 is provided, reflected electrons emitted from the semiconductor wafer are detected by the reflected electron detector 808, the detected reflected electrons are converted into a digital signal by an A/D converter 809 or 810, stored in the image memory 815 in the processing/control part 814, and subjected to image processing in the CPU 816 in accordance with a purpose. While application of a mask area to the template and processing of template matching are performed in the processing/control part 814, the information is stored in a storage medium 821. In the example of FIG. 15, the processings described above are executed by an arithmetic unit and a storage medium built in the control apparatuses 1504 and 1505 and the data management apparatus 1501.

Although a scanning electron microscope is shown as an example of an inspection apparatus in this example, it is not limited thereto and it can be applied to an inspection apparatus or the like for acquiring an image and performing template matching processing.

Figure 9:
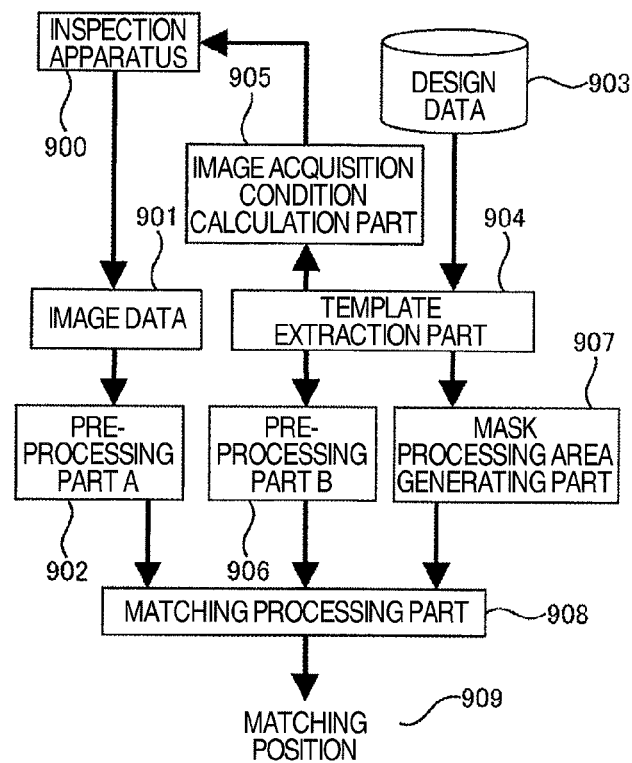
FIG. 9 A chart for explaining another example of a pattern matching apparatus.

FIG. 9 is a chart for explaining another example of template matching processing in a template matching apparatus. A difference from the method exemplified in FIG. 1 lies in that a process of extracting a template from design data is performed. In FIG. 1 it is a method in which template matching using mask processing is performed on template data which has been already extracted.

By enabling an arbitrary area to be extracted from design data in this manner, the user may save a trouble of separately preparing a template extracted from design data. This method is described with reference to FIG. 9. First, extraction of a template which becomes an area to be subjected to matching from design data 903 is performed in a template extraction part 904. As for this template extraction, it is conceivable that the user sets an area manually from design data or a pattern with a characteristic suitable for a template is extracted automatically from design data.

Next, condition information for acquiring an image of a sample is calculated in an image acquisition condition calculation part 905 based on information of the position and the size of the extracted template. The image acquisition condition here includes information of the amount of moving a field of view for aligning the field of view of the inspection apparatus with the template position and information of the size of the field of view when an image is acquired in the template position. Incidentally, the size of the field of view is set based on the position of the template extracted from design data in consideration of the accuracy of the movement of the field of view in the inspection apparatus so that the template enters the field of view in the movement of the field of view. Under this image acquisition condition, an image is acquired in the inspection apparatus 900.

Hereinafter, it is the same method as template matching processing using mask processing described with reference to FIG. 1. That is, template matching is performed with image data 901 of the search-target area acquired in the inspection apparatus or the like and the design data-based template extracted from design data to ultimately calculate a matching position 909. In a pre-processing part A 902, noise reduction processing and edge enhancement processing are performed. Incidentally, it is possible either or both of the two processes may be performed; or it is possible neither is performed. In a pre-processing part B 906, edge enhancement processing is performed on the template. Incidentally, it is possible edge enhancement processing is not performed. In a mask processing area generating part 907, a mask area is generated based on the template with any one of the mask generating processings described with reference to FIGS. 3, 4, and 5 or in combination thereof. Finally, template matching is performed in a matching processing part 908 using the pre-processed search-target image, the pre-processed template, and the mask information to thereby calculate the matching position 909. In this manner, template matching can be performed with only giving design data to the inspection apparatus without a need of separately preparing an extracted template.

Figure 10:
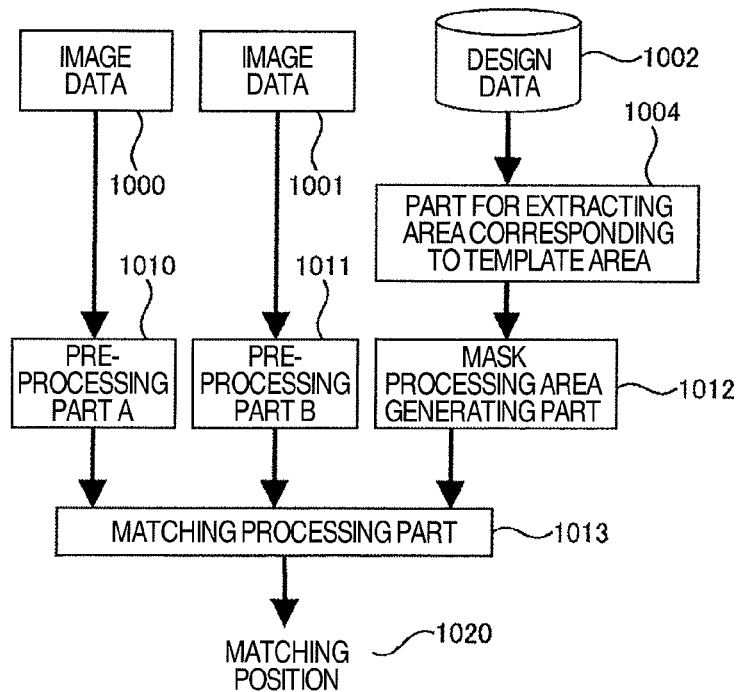
FIG. 10 A chart for explaining still another example of a pattern matching apparatus.

FIG. 10 is a chart for explaining still another example of template matching processing in a template matching apparatus. A difference from the method exemplified in FIG. 1 lies in that a template is generated from an image acquired by an inspection apparatus. Then, an area corresponding to the template is extracted from design data, a mask processing area is generated from the extracted design data, and template matching is performed using the mask processing area.

In a pre-processing part A 1010, a search-target image 1000 acquired with an inspection apparatus or the like is subjected to processing of reducing noise contained in the image, an edge processing of enhancing pattern profiles, or the like. In a pre-processing part B 1011, image data for template acquired with the inspection apparatus is subjected to processing of reducing noise contained in the image, an edge enhancement processing of enhancing pattern profiles, or the like as well. By processings in the pre-processing part A and the pre-processing part B, matching processing 1013 in the subsequent stage can be made robust.

In a part 1004 for extracting an area corresponding to the template area, a portion corresponding to the template is extracted from design data. Setting of this extracted area is conducted manually by the user or as rendering an area matched by template matching processing between the template and the design data. In the matching processing here, template matching without using mask processing is performed. Accordingly, it is desirable that such an image as matching succeeds without mask processing, that is, an image in which appearance of patterns not present in design data is little is selected as image data for setting the template. Also in a mask processing area generating part 1012 a mask processing area is generated from an area corresponding to the template area extracted from design data. Using the pre-processed search-target image, the pre-processed template, and the mask processing area template matching is performed in a matching processing part 1013 to output a matching position 707.

In this manner, using an image obtained by an actual inspection apparatus as a template permits template matching to be performed robustly even when there is a large deviation between the shape of a pattern in design data and the shape of an actually formed semiconductor pattern. In addition, because mask processing is performed, matching can be performed robustly even when a pattern not present in the template enters the matching success position of the search-target image.

Figure 11:
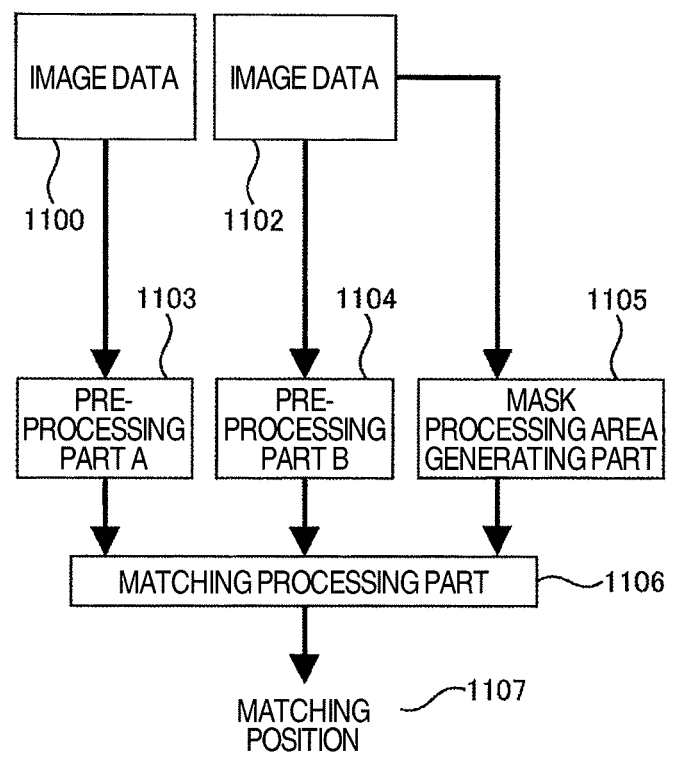
FIG. 11 A chart for explaining still another example of a pattern matching apparatus.

FIG. 11 is a chart for explaining still another example of template matching processing in a template matching apparatus.

A difference from the method exemplified in FIG. 1 lies in that a template is generated from an image acquired with an inspection apparatus and that a mask processing area is not generated from design data but generated from the template which is an image acquired with the inspection apparatus or the like. In this method, for example, as for generation of a mask processing area as described with reference to FIG. 3 the template, which is an image acquired from the inspection apparatus, is subjected to edge enhancement processing or the like and the area in the vicinity of the outline of a pattern thus calculated is set as an unmask area. In this manner, matching processing using only the area of the vicinity of the edge portion of the pattern becomes possible. Namely, robust matching becomes possible even when a pattern not present in the template appears in the search-target image.

In a pre-processing part A 1103, a search-target image 1100 acquired with an inspection apparatus is subjected to processing of reducing noise contained in the image, an edge processing of enhancing pattern profiles, or the like so that matching processing 1106 in the subsequent stage is made robust. Also, in a pre-processing part B 1104, image data for template acquired with the inspection apparatus is subjected to processing of reducing noise contained in the image, an edge enhancement processing of enhancing pattern profiles, or the like so that the matching processing 1106 in the subsequent stage is made robust.

In addition, in a mask processing area generating part 1105, a mask processing area is generated based on image data 1102 for template. As described above, with edge enhancement processing or the like onto the image data 1102 the outline of a pattern in the template is extracted. The pattern outline extraction method is not limited thereto and any method may work as long as the outline of a pattern is extracted. By using the method of FIG. 3, then, the portion in the vicinity of the extracted outline (described as an edge portion in FIG. 3) is set as an unmask area. Incidentally, the mask processing area may be generated in combination of mask areas generated in the methods described with reference to FIGS. 4 and 5. In a matching processing part 1106 template matching is performed using the pre-processed search-target image, the pre-processed template, and the mask processing area to output a matching position 707. In this manner, it becomes possible that a mask processing area is generated from the template generated from the image acquired from the inspection apparatus without using design data so that template matching using mask processing is performed. By this, even when design data cannot be prepared, template matching using mask processing can be performed at the time of inspection so that robust matching processing can be performed.

FIG. 12 is a view for explaining an example of a GUI screen for generating a mask processing area. This view is an example of GUI displayed on the display device 820 of the inspection apparatus which can perform template matching processing using mask processing. Whether matching using mask processing is to be executed or not can be selected with a selection box 1201. When matching processing using mask processing is to be executed, a method for generating a mask processing area is performed. For example, the width of an unmask area generated in the vicinity of the pattern edge portion in design data can be designated 1202. It can be set whether a processing of setting an area having no patterns in a plurality of design data as an unmask area as shown in FIG. 4 is to be executed or not 1203. A mask area can also be added manually 1204. A template image 1210 which becomes a source for generating a mask processing area or a generated mask processing area 1211 can be displayed. The width of the unmask area can also be adjusted 1212 using a slide bar. As described above, the user can adjust the mask processing area while confirming it through the GUI. Incidentally, this GUI need not have all members described here but may be provided with all or part of them.

Incidentally, the mask area can be defined as "an area not subjected to operation of sum of products or the like to obtain a correlation value"; however, because substantially the same effect can be obtained if operation of sum of products or the like is performed but not reflected on a correlation value, it may be as "an area subjected to operation of sum of products or the like but not reflected on a correlation value" instead of "an area not subjected to operation of sum of products or the like to obtain a correlation value". Namely, it will go well as long as "an area excluded from an object of comparison" can be set.

Further, a method for implementing matching with high accuracy by performing an operation on the area defined as a mask area in the aforementioned embodiment different from that applied to the unmask area is described below. First, it is conceivable that judgment of the degree of coincidence is performed on an area corresponding to the mask area while weighting of the matching score for the unmask area is lowered. More specifically, it is conceivable that an area (first area) having a possibility of influences of a lower layer pattern and the other area (second area) are defined, a predetermined coefficient is multiplied by the matching score of the first area to lower relative weighting with respect to the second area, and comparison processing is performed based on a composite matching score of the first and second areas. When such processing is performed, lowering of the matching score of the entire template can be suppressed even if a lower layer pattern appears on the image and, accordingly, the success rate of matching can be maintained high.

Next, it is conceivable that second comparison processing is performed on the first area after first comparison processing is performed selectively on the aforementioned second area. That is, it is conceivable that different templates are prepared for the first and second areas, respectively, and the second comparison processing is performed after alignment is performed with the first comparison processing. Because accurate alignment with respect to an upper layer pattern is performed with the first comparison processing, a displacement between the upper and lower layers can be specified by taking, for example, a template used for a lower layer pattern as a template used for the second comparison processing.

It is also possible to grasp a state of the first area by preparing two kinds or more of templates when the second comparison processing is performed. For example, by preparing a template in which a lower layer pattern is expressed and a template in which it is not and performing matching using the two kinds of templates, judgment can be made as to whether the lower layer pattern is expressed on the sample or not. Because the first area can be judged to be in a sample state approximating to the template having a higher matching score, it becomes possible to grasp a state of a pattern having a possibility of variation due to process change or the like. Selecting a template having the highest degree of coincidence based on the judgment of the first area and combining a template applied to the first area and a template applied to the second area together to generate a new template can contribute to improvement of the matching score. Incidentally, the first comparison and the second comparison may be processed in parallel.

Next, a method for performing template matching using the degree of disagreement between the first area and the template when the first comparison and the second comparison are performed in combination is described.

When a state of appearance of a pattern in the first area changes due to process change or the like, it may be difficult to perform stable matching. In such a case, by performing matching based on the degree of coincidence as usual regarding the second area and evaluating the degree of disagreement regarding the first area in the search area of the template, stable matching can be performed regardless of process change or the like. When the state of the first area changes according to process change or the like, it is difficult to prepare a template for this portion in advance. On the other hand, when a spot where false detection occurs by template matching is a spot where change in the state of the first area as described above is absent, false detection can be suppressed by preparing a template which is equivalent or similar at a spot of false detection with respect to at least the first area and selecting a spot of a high degree of disagreement by judgment of the degree of disagreement.

Figure 13:
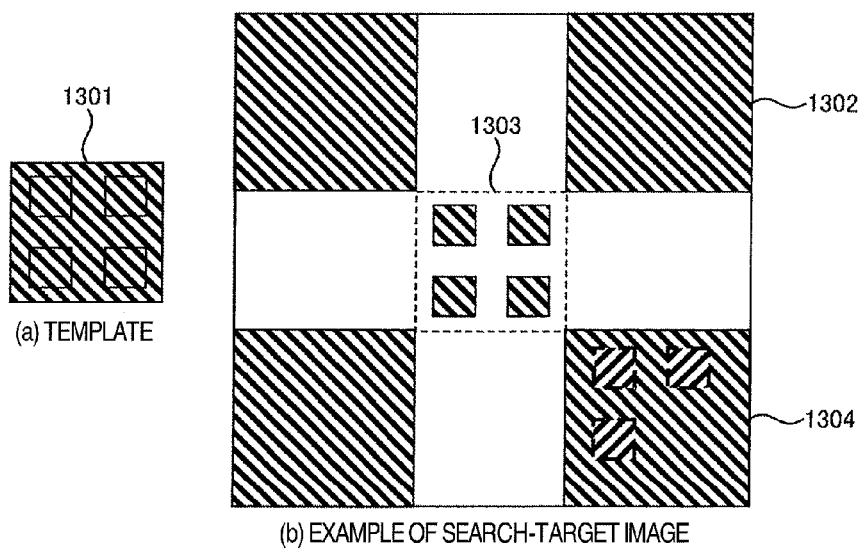
FIG. 13 Diagrams for explaining an example of a set of a template and a search-target image for execution of different comparison processings in a first area and in a second area.

FIG. 13 shows diagrams for explaining an example of a set of a template and a search-target image for execution of different comparison processings in the first area and the second area. FIG. 13 shows diagrams for explaining an example in which a template 1301 is used for searching in a search-target image 1302. A desired matching position 1303 and a position 1304 having a possibility of false detection exist in the search-target image 1302. In this example, setting a first area (an area having a possibility of appearance of a lower layer pattern) of the template 1301 to be the same as the position 1304 and selecting a position of a low degree of coincidence (a high degree of disagreement) with the template 1301 with respect to the first area, matching error onto the position 1304 can be suppressed.

This is particularly effective when there exists a position having the second area identical to the desired matching position in the search-target image and change of the first area of the desired matching position is possible; compatibility of improvement of robustness of matching as against pattern change and suppression of matching error can be achieved. Incidentally, although the aforementioned example has been described as an example in which the first area of the template 1301 is made the same as a portion of the position 1304 corresponding to the first area, it is not limited thereto; matching error can be suppressed by rendering a template in which, for example, there is a clear deviation from the first area of the desired matching position 1303 and which has the first area relatively similar to a portion corresponding to the first area of the position 1304.

Figure 14:
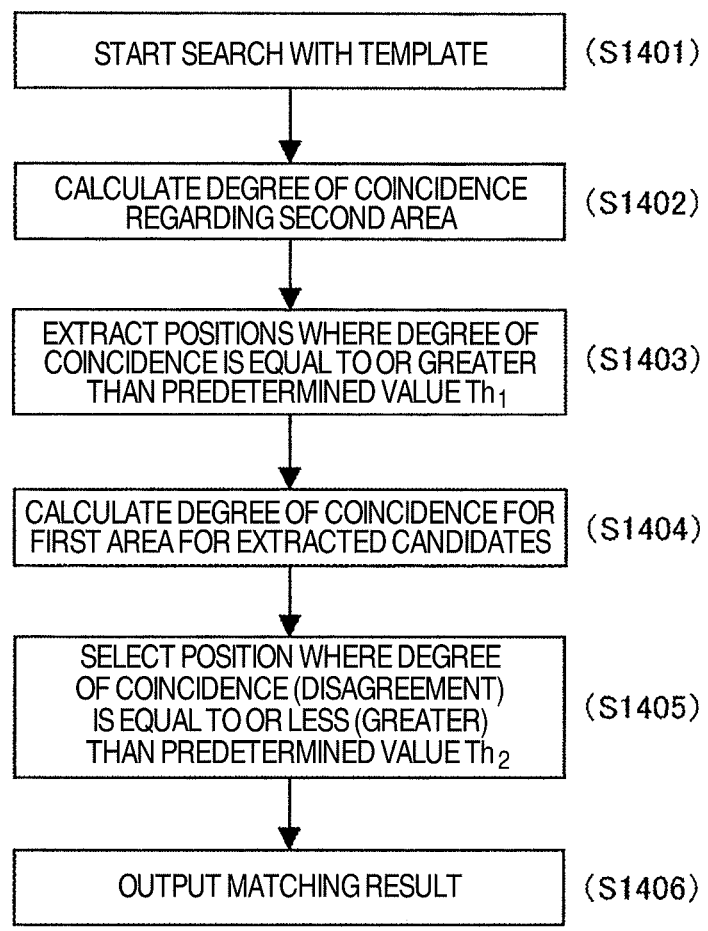
FIG. 14 A flow chart for explaining an example of a template matching method for execution of difference comparison processings in a first area and in a second area.

FIG. 14 is a flow chart for explaining an example of a template matching method for performing comparison processings different in the first area and the second area. After a search with a template is started (S1401), the degree of coincidence is calculated regarding the second area (S1402) and positions where the degree of coincidence is equal to or greater than a predetermined value or larger than a predetermined value are extracted as candidates for a matching position (S1403). When only one candidate is selected here, the candidate is judged to be a correct matching position and matching processing is terminated. When a plurality of candidates for a matching position are selected, the extracted candidates are subjected to operation of the degree of coincidence for the first area (S1404). In the judgment of the degree of coincidence, by selecting a position where the degree of coincidence is equal to or less than a predetermined value or smaller than a predetermined value (S1405), a matching result is outputted (S1406). Incidentally, in the judgment of the degree of coincidence, a position where the degree of disagreement is equal to or greater than a predetermined value or larger than a predetermined value may be selected. In this example, because whether matching succeeds or not is judged based on the degree of coincidence (the degree of disagreement) between the position of a target of false detection and the template, stable matching can be performed even when the position of a target of matching varies on the image due to process variations or the like.

REFERENCE SIGNS LIST 801 electron gun
802 stage
803 semiconductor wafer (sample)
804 deflector
805 objective lens
806 secondary electron detector
807, 809, 810, 812 A/D converter
808 reflected electron detector
811 optical camera
814 processing/control part
815 image memory
816 CPU
820 display device
821 storage medium

The invention claimed is:

1. A pattern matching method for performing pattern matching on a search-target image of a sample by using a template, comprising the steps of:
    defining in the template an excluding area where a first comparison between the template and the image is excluded, or a first comparison area and a second comparison area where a second comparison different from the first comparison is performed, in accordance with a status of the search-target image for each location where the template is positioned while matching is performed using the template so that an edge of a pattern in the template is excluded from the excluding area or the first comparison area; and
    executing template matching based on comparison processing excluding the excluding area or comparison processing in the first and second comparison areas.

2. A pattern matching method according to claim 1, wherein a lower layer pattern exists in a position of a sample specified by pattern matching and under a position corresponding to the excluding area or the first comparison area.

3. A pattern matching method according to claim 2, wherein the excluding area or the first comparison area is defined to comprise an area having a possibility that the lower layer pattern appears in the search-target image.

4. A pattern matching method according to claim 1, wherein an area other than an area along a pattern edge of the template is defined as the excluding area or the first comparison area.

5. A pattern matching method according to claim 1, wherein an area along a pattern edge of the template is selectively defined as an area subjected to comparison processing.

6. A pattern matching method according to claim 1, further comprising the step of performing a correlation operation between the search-target image and the template, wherein an area having a correlation value due to the correlation operation smaller than or equal to a predetermined value is defined as the excluding area or the first comparison area while an area having the correlation value greater than the predetermined value is defined as an area subjected to comparison processing or the second comparison area.

7. A pattern matching method according to claim 1, wherein the step of executing template matching further comprises the steps of:
    performing a coarse-to-fine search;
    setting the excluding area using a template for coarse search in a coarse search; and
    setting the excluding area using a template for fine search in a fine search.

8. A pattern matching apparatus for performing pattern matching on a search-target image of a sample using a template comprising:
    an arithmetic unit defining in the template an excluding area, in the excluding area comparison of the template and the image being excluded, or in the template a first comparison area and a second comparison area, in the second comparison area comparison different from one in the first comparison area being performed, in accordance with a status of the search-target image for each location where the template is positioned while matching is performed using the template so that an edge of a pattern in the template is excluded from the excluding area or the first comparison area; and performing template matching based on comparison processing excluding the excluding area, or based on comparison processing in the first and second comparison areas.

9. A pattern matching apparatus according to claim 8, wherein the arithmetic unit defines the excluding area or the first comparison area in an area where a lower layer pattern of the sample is located.

10. A pattern matching apparatus according to claim 9, wherein the area where the lower layer pattern of the sample is located comprises an area having a possibility that the lower layer pattern appears in the search-target image.

11. A pattern matching apparatus according to claim 8, wherein the arithmetic unit defines an area other than an area along a pattern edge of the template as the excluding area or the first comparison area.

12. A pattern matching apparatus according to claim 8, wherein the arithmetic unit defines selectively an area along a pattern edge of the template as an area subjected to comparison processing.

13. A pattern matching apparatus according to claim 8, wherein the arithmetic unit performs correlation operation between the search-target image and the template; and defines an area having a correlation value due to the correlation operation smaller than or equal to a predetermined value as the excluding area or the first comparison area and an area having the correlation value greater than the predetermined value as an area subjected to comparison processing or the second comparison area.

14. A pattern matching apparatus according to claim 8, wherein the arithmetic unit performs a coarse-to-fine search when the template matching is executed; defines the excluding area using a template for coarse search in a coarse search; and defines the excluding area using a template for fine search in a fine search.

15. A non-transitory computer readable medium having a computer program for making a computer connected to an image acquisition apparatus specify a position of a pattern on an image based on matching between the pattern on the image formed by the image acquisition apparatus and a template, the program defining in the template an excluding area, in the excluding area comparison of the template and the image being excluded, or in the template a first comparison area and a second comparison area, in the second comparison area comparison different from one in the first comparison area being executed, in accordance with a status of the search-target image for each location where the template is positioned while matching is performed using the template so that an edge of a pattern in the template is excluded from the excluding area or the first comparison area; and performing template matching based on comparison processing excluding the excluding area, or comparison processing in the first and second comparison areas.

16. The non-transitory computer readable medium having the computer program according to claim 15, wherein a lower layer pattern exists in a position of a sample specified by pattern matching and under a position corresponding to the excluding area or the first comparison area.

17. The non-transitory computer readable medium having the computer program according to claim 16, wherein the excluding area or the first comparison area is defined to comprise an area having a possibility that the lower layer pattern appears in the search-target image.

18. The non-transitory computer readable medium having the computer program according to claim 15, further defining an area other than an area along a pattern edge of the template as the excluding area or the first comparison area.

19. The non-transitory computer readable medium having the computer program according to claim 15, further defining an area along a pattern edge of the template selectively as an area subjected to comparison processing.

* * * * *